United States Patent [19]

German

[11] Patent Number: 5,256,943
[45] Date of Patent: Oct. 26, 1993

[54] ZERO ADJUSTMENT SHAFT ENCODER CONTROL FOR STEPPING MOTORS

[75] Inventor: Trevor J. German, Waterloo, Canada

[73] Assignee: NCR Corporation, Dayton, Ohio

[21] Appl. No.: 862,928

[22] Filed: Apr. 3, 1992

[51] Int. Cl.$^5$ .............................................. G05B 19/40
[52] U.S. Cl. ..................................... 318/685; 318/696
[58] Field of Search .................................. 318/685, 696

[56] References Cited

U.S. PATENT DOCUMENTS

| | | | |
|---|---|---|---|
| 4,025,837 | 5/1977 | Meier et al. | 318/561 |
| 4,426,608 | 1/1984 | Larson et al. | 318/685 |
| 4,591,774 | 5/1986 | Ferris et al. | 318/696 |
| 4,710,690 | 12/1987 | Reid et al. | 318/685 |
| 4,761,598 | 8/1988 | Lovrenich | 318/685 |
| 4,855,660 | 8/1989 | Wright et al. | 318/696 |
| 4,868,477 | 9/1989 | Anderson et al. | 318/696 |
| 4,961,038 | 10/1990 | MacMinn | 318/696 |

OTHER PUBLICATIONS

"A Stepping Motor Primer Part I: Theory of Operation" by Paul Giacomo; Byte Publications, Inc., Feb. 1979; pp. 90–105.
"A Stepping Motor Primer Part 2: Interfacing and Other Considerations" by Paul Giacomo; Byte Publications, Inc., Mar. 1979; pp. 142–149.

Primary Examiner—William M. Shoop, Jr.
Assistant Examiner—Karen Masih
Attorney, Agent, or Firm—James M. Stover

[57] ABSTRACT

A stepping motor has an attached encoder which provides automatic commutation point alignment for maximum efficiency and torque during closed-loop operation. Novel use of a fine line encoder along with a phase mapping circuit permit shaft/rotor alignment of the stepping motor with minimum commutation errors, and without the need for manual adjustments.

6 Claims, 5 Drawing Sheets

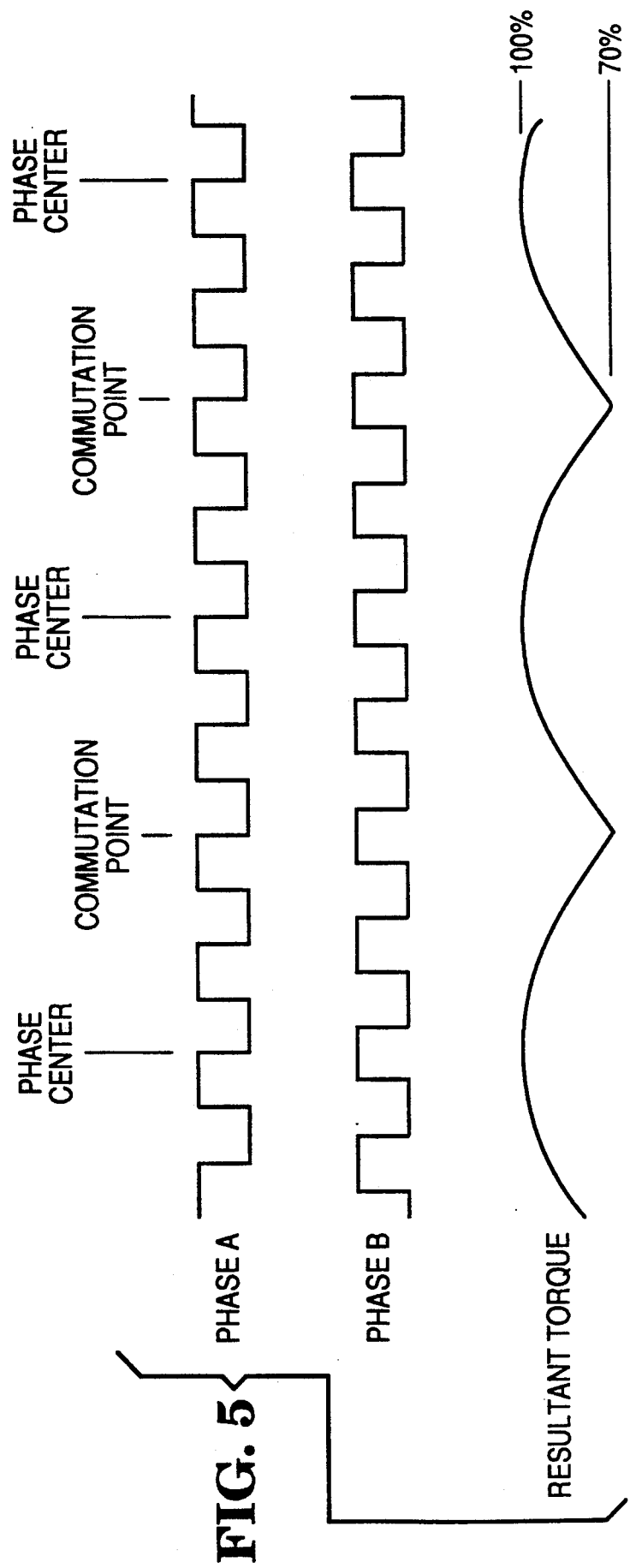

FIG. 7

| INITIAL CONDITIONS | | REQUIRED SETUP STATES | | | | DESIRED CONDITIONS | |
|---|---|---|---|---|---|---|---|
| DIRECTION | PHASE B | PHASE A | INVERT B | INVERT A | SWAP | TRAN B | TRAN A |
| FORWARD | LOW | LOW | LOW | LOW | LOW | LOW | LOW |
| FORWARD | LOW | HIGH | HIGH | LOW | HIGH | LOW | LOW |
| FORWARD | HIGH | HIGH | HIGH | HIGH | LOW | LOW | LOW |
| FORWARD | HIGH | LOW | LOW | HIGH | HIGH | LOW | LOW |
| REVERSE | LOW | LOW | LOW | LOW | HIGH | LOW | LOW |
| REVERSE | LOW | HIGH | LOW | HIGH | LOW | LOW | LOW |
| REVERSE | HIGH | HIGH | HIGH | HIGH | HIGH | LOW | LOW |
| REVERSE | HIGH | LOW | HIGH | LOW | LOW | LOW | LOW |

ZERO ADJUSTMENT SHAFT ENCODER CONTROL FOR STEPPING MOTORS

The present invention generally relates to stepping motors. More particularly, the present invention relates to a method and apparatus for commutation alignment and adjustment during closed-loop operation of a stepping motor.

BACKGROUND OF THE INVENTION

A stepping motor is a motor capable of bi-directional rotation by moving its rotor through a series of mechanically defined steps in response to the excitation of its stator windings. The number of input steps required to rotate the motor shaft through one complete revolution varies depending upon the intended application of the motor, typically having a value of 12, 24, 72, 144, 180 or 200 steps-per-revolution.

A schematic diagram of a four-phase stepping motor 100 is shown in FIG. 1. Motor 100 basically consists of a permanent magnet rotor 102 with north and south ends 104 and 106, respectively, mounted on a rotor shaft 108. A number of stator coil mounts (110, 114, 118 and 122) and stator coils (112, 116, 120 and 124) are mounted around rotor 102.

During operation of motor 100 the stator coils (112, 116, 120 and 124) are selectively energized to cause a movement in rotor 102 to a desired position via magnetic attraction between the permanent magnet rotor and the stator coils. The energization of a stator coil causes it to behave as a magnet with its strength and polarity determined by the amount and direction of current flow in the coil. Rotor 102 can change its position from the one shown in FIG. 1 to the position shown in FIG. 2, for example, by a different pattern of stator coil energization from the original pattern in FIG. 1. Energization of the stator coils is controlled by commutation logic.

The stepper motor as shown in FIG. 1 has been simplified to provide a basic general understanding of the construction and operation of stepper motors. Additional information concerning the construction and operation of stepping motors is provided in an article entitled "A Stepping Motor Primer" by Paul Giacomo. The article was published in two parts, the first part appearing in the February 1979 issue of BYTE magazine on pages 90-105 thereof, and the second part appearing in the March 1979 issue of BYTE magazine on pages 142-149 thereof.

In typical prior art brushless stepping motor systems, the commutation logic for changing the magnetic fields of the stator coils is supplied by a digital controller board. In a closed loop system the controller board receives rotor/shaft position and spin direction information from an encoder coupled to the motor shaft. In a typical two-phase shaft encoder, two output signals in the form of square waves having a 90 degree phase difference are provided. Four encoder output states or steps per motor step are thereby provided by the encoder once during each motor step, as shown in Table 1 below. The two encoder output signals are identified as signals PHASE A and PHASE B in Table 1.

TABLE 1

| Encoder Output State | Encoder States per Motor Step | |
|---|---|---|
| | PHASE A | PHASE B |
| 1 | 0 | 0 |
| 2 | 0 | 1 |
| 3 | 1 | 1 |
| 4 | 1 | 0 |

The commutation logic determines shaft position, shaft rotation and direction of rotation from the encoder output signals and signal states. The number of edges in the square waves are indicative of angular increments of rotation of the shaft and rotor; one encoder phase, i.e. the sequence of four states shown above, corresponding to one motor step. Direction of rotation can be determined from the phase relationship between the two encoder output signals. In the closed-loop system described above, positioning error for the motor shaft resulting from encoder misalignment can not exceed the size of the encoder step, i.e., ¼ of a motor step.

FIG. 3A shows a graph of the motor torque T versus the motor shaft angle A. In general, the motor torque varies according to a sinusoidal function dependent upon the rotor position. This relationship can be expressed in equation form as follows:

$$T = k*I*\sin(A) \qquad \text{EQN 1}$$

where T is torque, k is a torque constant, I is the applied current and A is the angular position of the rotor. FIG. 3B shows the resulting torque T when commutation changes are made at the optimum switching points, thus producing the maximum possible torque in the motor. That is, the current supplied to the coils in one state is changed at the point where the torque falls to the level of the subsequent current state (which is rising at the time, as illustrated in the figure). However, the torque shown in FIG. 3B occurs under ideal conditions.

The graph of torque versus shaft position in FIG. 3C illustrates how actual torque provided, even under optimum switching conditions, is lessened by the effects of current switching times. Torque produced is further diminished if commutation is offset from optimum switching time, e.g. a forty-five degree electrical error results in the torque waveform shown in FIG. 3D.

As can be seen in FIG. 3D, an error in alignment between the encoder and stepper motor shaft results in a loss of applied torque. It is essential that the shaft encoder be aligned with the commutation points if optimal stepper motor performance is to be achieved. Meticulous adjustment techniques must be executed to precisely and accurately align a shaft encoder to prevent the loss of applied torque shown in FIG. 3D.

OBJECTS OF THE INVENTION

It is therefore an object of the present invention to provide a new and useful drive circuit for a stepper motor.

It is another object of the present invention to provide such a drive circuit which eliminates the need for meticulous adjustment techniques to align an encoder with the stepper motor shaft.

It is yet another object of the present invention to provide a new and useful closed loop drive circuit for a stepper motor which employs an encoder having a number of phases per revolution which is a multiple of the number of steps per revolution of the stepper motor.

It is still a further object of the present invention to provide a new and useful closed loop drive circuit for a stepper motor which employs a translation circuit for reordering encoder signal output states.

SUMMARY OF THE INVENTION

There is provided, in accordance with the present invention, a drive circuit for a stepper motor which includes a shaft encoder having a resolution which is a multiple of the resolution of the stepper motor. For example, an 800 phase-per-revolution encoder implemented in a drive circuit for a 200 step-per-revolution stepper motor reduces maximum positioning error for the motor shaft due to encoder misalignment from ¼ of a motor step to 1/16 of a motor step.

In the described embodiment, the drive circuit includes commutation or control logic for controlling the operation of said stepper motor; a two-phase encoder providing first and second binary square wave output signals for indicating the degree and direction of rotation of the shaft of said stepper motor, the first and second signals differing in phase by 90 degrees; and translation logic connected to receive the first and second encoder output siHgnals for reordering the sequence of signal pulses received from the encoder. The translation circuit provides translated versions of the first and second encoder signals to the control logic which is responsive thereto to modulate operation of said stepper motor.

The mapping function performed by the translation logic is established by initialization logic included within the commutation logic. The initialization logic senses the state of the first and second encoder output signals at motor power-on; extracts configuration parameters corresponding to the state of the first and second encoder output signals and the direction of rotation of the stepper motor from a look-up table; and provides the configuration parameters to the translation logic. The translation logic is configured in response to the configuration parameters to map the encoder output signals to a desired state sequence such that the control logic always associates a known signal state with the beginning of each motor step.

The above and other objects, features, and advantages of the present invention will become apparent from the following description and the attached drawings.

BRIEF DESCRIPTION OF THE DRAWINGS

The following is a brief description of the drawing figures referred to in the specification of this letters patent.

FIG. 5 is a timing diagram of encoder phase signals along with a graph of the step-wise motor torque resulting from a combination of the encoder phase signals.

FIG. 7 is a translation logic table for the translator circuitry shown in FIG. 6.

DETAILED DESCRIPTION OF THE PREFERRED EMBODIMENT

The discussion which follows describes a method which reduces shaft position alignment errors and torque loss through the employment of a shaft encoder having a number of phases per revolution which is a multiple of the number of steps-per-revolution of the stepper motor.

Shaft position alignment error and torque loss are directly related to the single step accuracy of the encoder. Accordingly, alignment error and torque loss are inversely related to the resolution of the encoder, i.e., the more steps or lines on the encoder the smaller the alignment error. Thus, utilization of a shaft encoder having greater resolution than the stepper motor provides a simple solution to shaft alignment and torque loss problems. Where extremely high stepper motor resolution is required, an encoder having still greater resolution should be employed.

Figure 4:
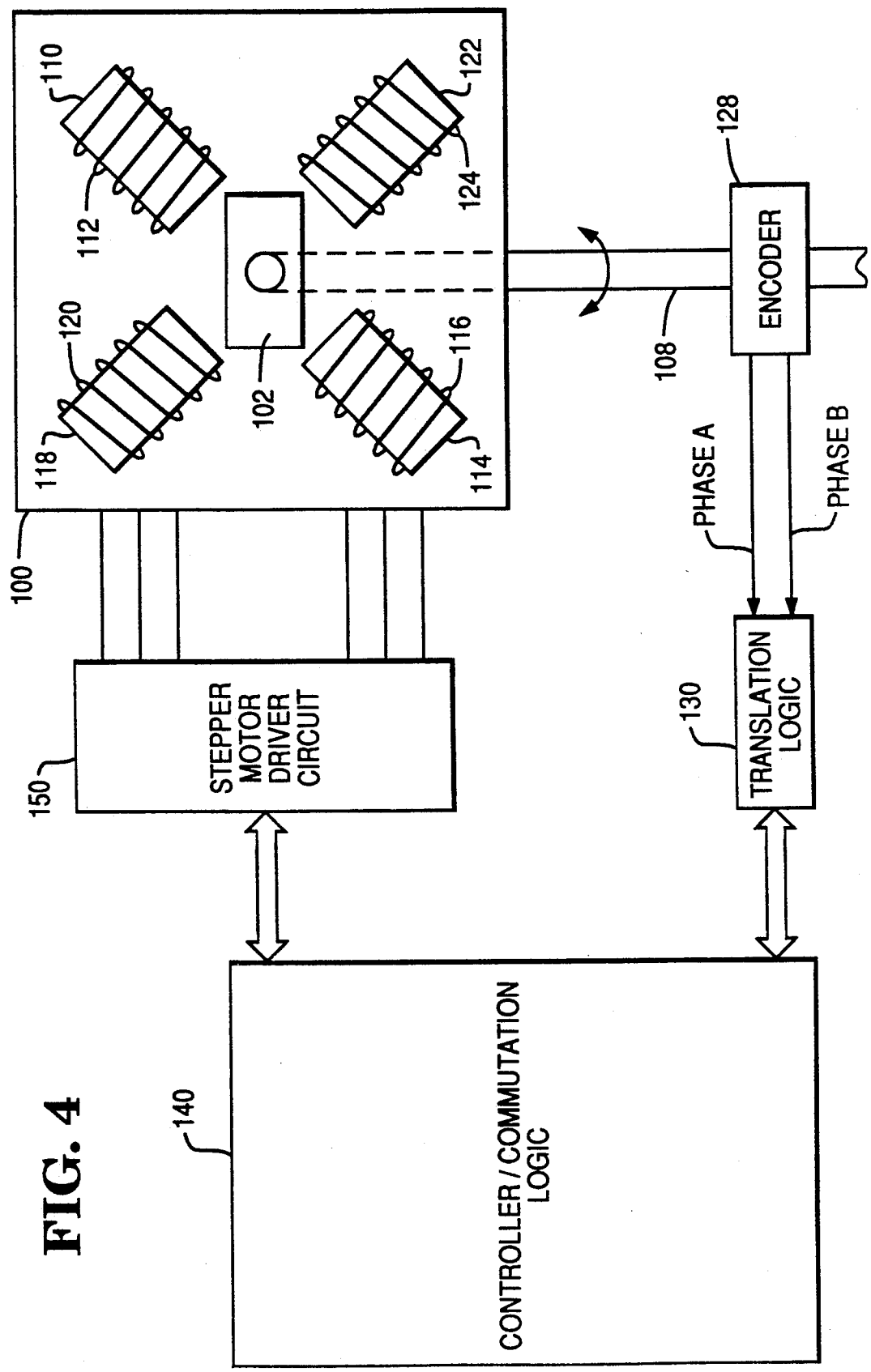
FIG. 4 is a functional block diagram of a stepper motor control system including an encoder and translation circuit in accordance with the present invention.

The functional block diagram of FIG. 4 shows a stepper motor control system in accordance with the present invention. The control system includes controller/commutation logic 140 which operates stepper motor 100 through drive circuit 150 in a conventional fashion. Feedback information concerning shaft position and direction of rotation information is generated by an encoder 128 and translation circuit and provided to controller/commutation logic 140. Encoder 128 is coupled to the shaft 128 of stepper motor 100 and generates two square wave output signals, identified as signals PHASE A and PHASE B, having a 90 degree phase difference. Signals PHASE A and PHASE B are provided to a translation circuit 130, which will be discussed in greater detail below.

In accordance with the present invention, encoder 128 is selected to have a resolution which is a multiple of the resolution of the stepper motor, e.g. encoder 128 is selected to have a resolution of 800 lines-per-revolution and motor 100 is selected to have a resolution of 200 steps-per-revolution. A timing diagram of encoder phase signals generated by 800-line two-phase encoder 128, along with a graph of the step-wise motor torque of 200-step stepper motor 100, is shown in FIG. 5. The output states per motor step for 800-line encoder 128, are listed below in Tables 2 below.

TABLE 2

| 800-Line Encoder States per Motor Step | | |
|---|---|---|
| Encoder Output State | PHASE A | PHASE B |
| 1 | 0 | 1 |
| 2 | 0 | 0 |
| 3 | 1 | 0 |
| 4 | 1 | 1 |
| 5 | 0 | 1 |

TABLE 2-continued

800-Line Encoder States per Motor Step

| Encoder Output State | PHASE A | PHASE B |
| --- | --- | --- |
| 6 | 0 | 0 |
| 7 | 1 | 0 |
| 8 | 1 | 1 |
| 9 | 0 | 1 |
| 10 | 0 | 0 |
| 11 | 1 | 0 |
| 12 | 1 | 1 |
| 13 | 0 | 1 |
| 14 | 0 | 0 |
| 15 | 1 | 0 |
| 16 | 1 | 1 |

Whereas a 200-line two-phase encoder provides four states per motor step once during each motor step, as shown in Table 1, it is seen in FIG. 5 and Table 2 above that encoder 128 provides sixteen states per step of the motor. The sixteen-state sequence generated and output by 800-line encoder 128 during each motor step consists of a four-state sequence which is repeated four times, e.g., states 5 through 8, 9 through 12 and 13 through 16 are equivalent to states 1 through 4.

Figure 1:
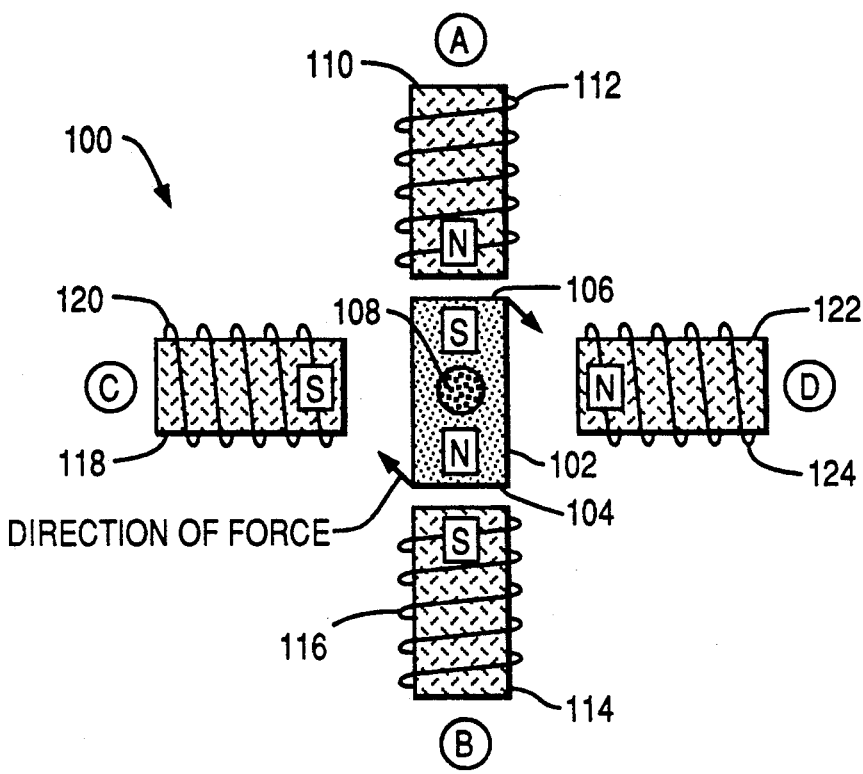
FIG. 1 is a schematic diagram showing the stator coils and rotor in an elementary stepping motor.
Figure 2:
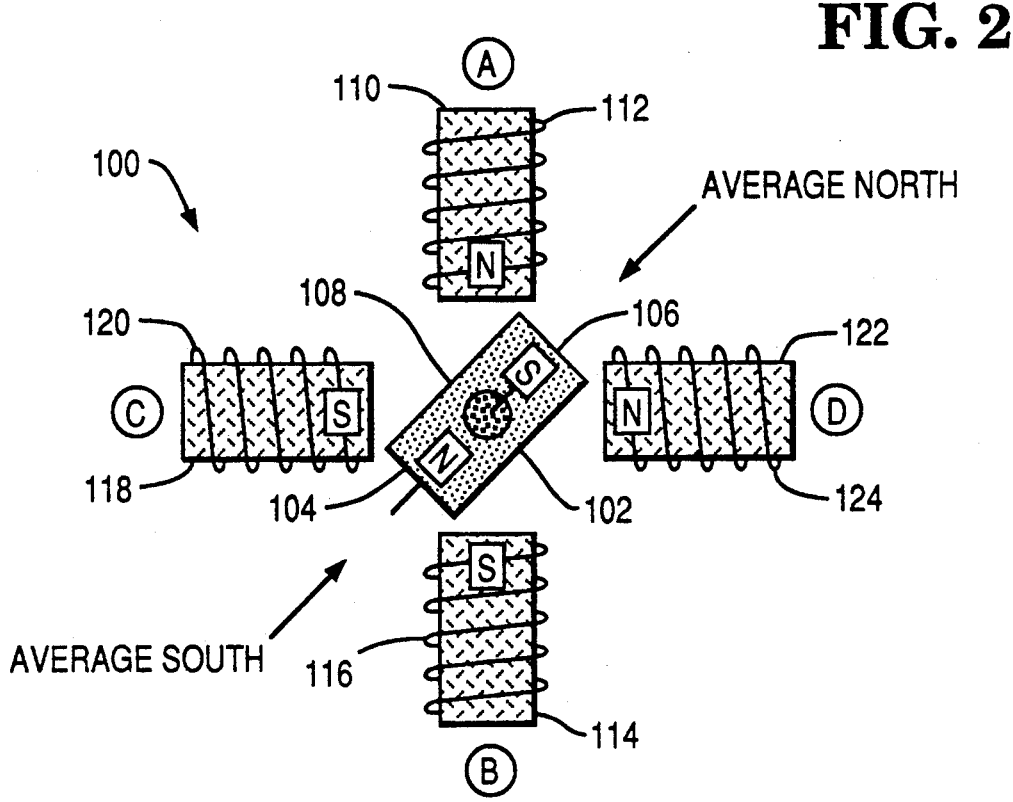
FIG. 2 is a schematic diagram showing the stator coils and rotor in the elementary stepping motor in FIG. 1, but having a different rotor position.
Figure 3A:
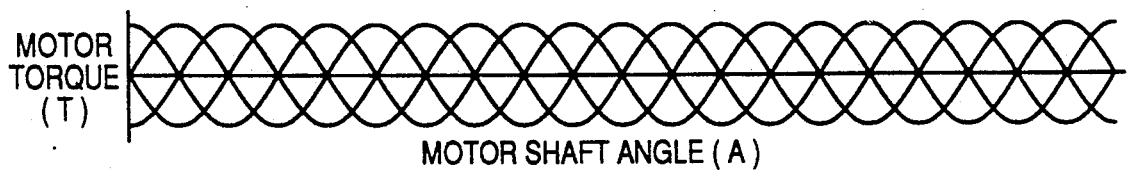
FIG. 3A is a graph of motor torque versus rotor position without current switching.
Figure 3B:
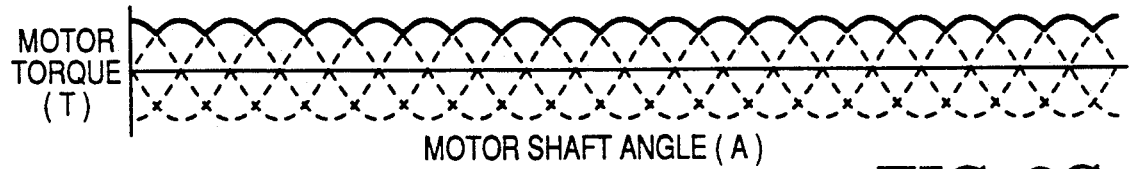
FIG. 3B is a theoretical graph of motor torque versus rotor position with current switching at optimum switching points.
Figure 3C:
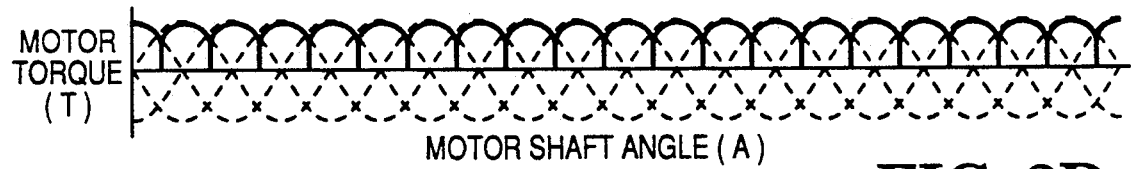
FIG. 3C is an actual graph of motor torque versus rotor position with current switching at the theoretical optimum switching points, showing the effects of inductance on current switching.
Figure 3D:
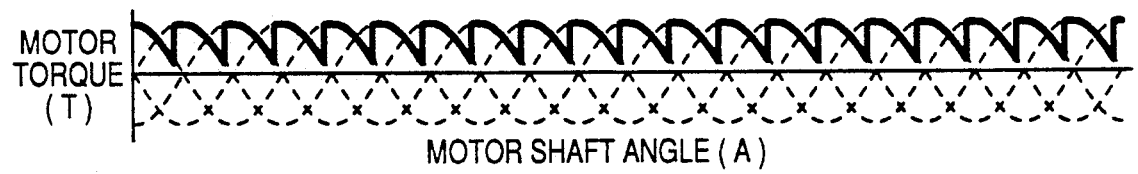
FIG. 3D is an actual graph of motor torque versus rotor position where a commutation error of forty-five degrees electrical is present.
Figure 6:
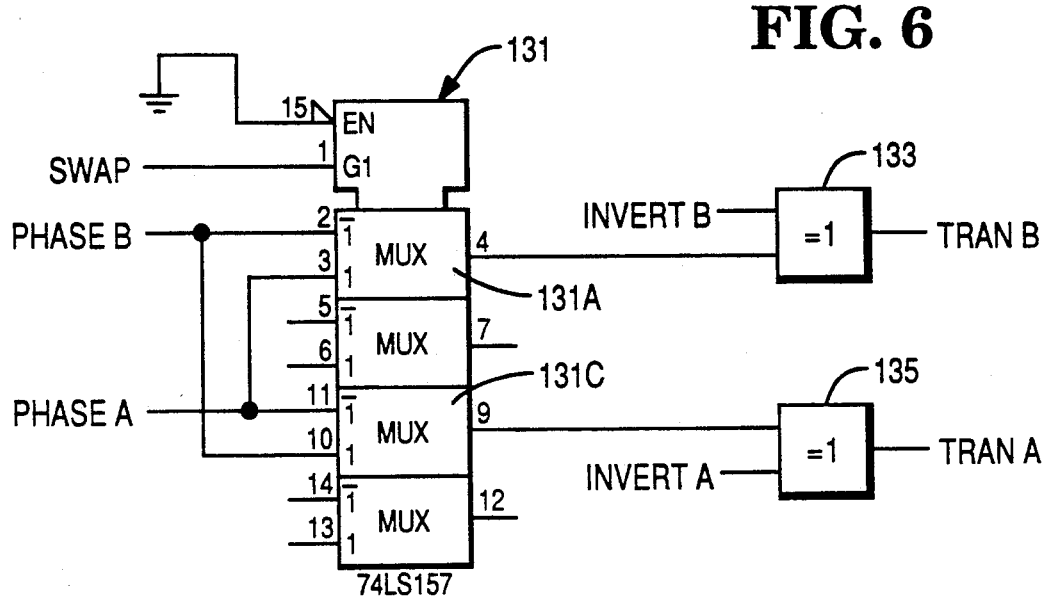
FIG. 6 is a schematic block diagram of the translator circuitry for translating the encoder phase signals.

Translation logic 130 is provided to transform the information received from encoder 128 for use by commutation logic 140. Translation logic 130 maps the output received from encoder 128 to a desired series of states regardless of their actual alignment. A schematic block diagram of the circuitry included within translation logic block 130 is shown in FIG. 6. The circuit includes a 2:1 multiplexer 131A having a first input, identified by 1, connected to receive signal PHASE B and a second input, identified by 1, connected to receive signal PHASE A. The output of multiplexer 131A is provided to an exclusive-OR gate 133 together with a control signal INVERT B received from controller 140. The output of exclusive-OR gate 133 is the translated form of signal PHASE B, identified as signal TRAN B.

The translated version of signal PHASE A, signal TRAN A, is generated by an exclusive-OR gate 135 which combines the output of a second multiplexer 131C having its 1 input connected to receive signal PHASE A and its 1 input connected to receive signal PHASE B with a control signal INVERT A received from controller 140. The configuration of multiplexers 131A and 131C are controlled by signal SWAP received from controller 140. The signals received at the multiplexer 1 inputs are provided to gate 133 and 135 when signal SWAP is set low. The signals received at the multiplexer 1 inputs are provided to gates 133 and 135 when signal SWAP is set high.

The circuitry shown in FIG. 6 implements the translation logic shown in the table of FIG. 7. The translation logic table shows the required set-up conditions and the desired on-phase conditions for eight possible initial conditions. The initial conditions reflect the state of the encoder when the motor is on-phase and no translation is being performed. It should be noted that the encoder sequence generated when driving the motor forward is different that when driving the motor backward, hence, the required motor direction is included as an initial condition. The set-up states are set by the controller to obtain the desired translation. The desired condition is provided for reference and shows that the controller expects both phases, TRAN A and TRAN B, to be low when the motor is on-phase.

The sequence of events executed at power on by controller 140 to set up the translation logic so that the translated encoder sequence, i.e., the combination of signals TRAN A and TRAN B, is in alignment with the shaft position of stepper motor 100 is as follows:

1. Motor 100 is powered up and held on an arbitrary phase;
2. Translation logic 130 is initialized such that the encoder outputs are provided to controller 140 without translation, i.e., TRAN A=PHASE A and TRAN B=PHASE B;
3. After a suitable delay to allow any start-up oscillations to subside the controller examines the encoder state;
4. Using the detected encoder state and the required motor direction the controller determines the translation configuration required by accessing a look-up table; and
5. The translation logic control lines INVERT A, INVERT B and SWAP are configured as specified in the look-up table.

The translation function performed by translation logic 130 could be implemented through software executed by controller 140, however, in the system described herein it is assumed that the controller is configured to operate using an interrupt caused by an edge from the encoder and that it expects the encoder state sequence to be a particular sequence beginning at the motor on-phase location. This is necessary when driving a step motor at rates which leave little time for the controller to translate the step sequence.

Utilizing the procedure described above, the positioning error for the motor shaft resulting from encoder misalignment can never be greater than 1/16 of a motor step, or 6.25%, as positioning error can not exceed the size of the encoder step. This much alignment error compares with the amount of alignment error found acceptable during manual adjustment.

It can thus be seen that there has been provided by the present invention a closed-loop drive circuit for a stepper motor which eliminates the need for meticulous adjustment techniques to align an encoder with the stepper motor shaft. The drive circuit automatically aligns the encoder and reorders the encoder signal output states such that positioning error for the motor shaft resulting from encoder misalignment is minimized.

Although the presently preferred embodiment of the invention has been described, it will be understood that various changes may be made within the scope of the appended claims.

What is claimed is:

1. A drive circuit for a stepper motor, comprising:
   a shaft encoder having a resolution which is a multiple of the resolution of said stepper motor, wherein said shaft encoder is a two-phase encoder providing first and second binary square wave output signals, said first and second signals differing in phase by 90 degrees;
   translation logic connected to receive said first and second signals from said encoder for reordering the sequence of signal pulses received from said encoder, wherein said translation logic is responsive to at least one configuration signal to select a reordering sequence of said signal pulses received from said encoder.

2. The drive circuit according to claim 1, further comprising:

initialization logic connected to receive said first and second encoder signals and to provide said configuration signal to said translation logic, wherein said initialization logic executes the following steps upon powering on said stepper motor:

senses the state of said first and second encoder signals; and extracts configuration information corresponding to the state of said first and second encoder signals and the direction of rotation of said stepper motor from a look-up table; and provides said configuration information to said translation logic via said configuration signal.

3. In a closed-loop drive circuit for a stepper motor including control logic and a two-phase encoder providing first and second binary square wave output signals, said first and second signals differing in phase by 90 degrees, the improvement comprising:

translation logic connected to receive said first and second signals from said encoder for reordering the sequence of signal pulses received from said encoder, said translation circuit providing first and second translated encoder signals to said control logic;

said translation logic comprising:

a first 2:1 multiplexer having a first input connected to receive said first encoder signal and having a second input connected to receive said second encoder signal;

a second 2:1 multiplexer having a first input connected to receive said second encoder signal and having a second input connected to receive said first encoder signal;

each of said first and second multiplexers being responsive to a first configuration signal received from said control logic for selecting the multiplexer input to be provided as output;

a first exclusive-OR circuit having a first input for receiving a first configuration signal and a second input connected to receive the output of said first multiplexer, the output of said first exclusive-OR circuit being said first translated encoder signal; and a second exclusive-OR circuit having a first input for receiving a second configuration signal and a second input connected to receive the output of said second multiplexer, the output of said second exclusive-OR circuit being said second translated encoder signal.

4. A closed-loop drive circuit for a stepper motor, comprising:

control logic for controlling the operation of said stepper motor;

a two-phase encoder providing first and second binary square wave output signals for indicating the degree and direction of rotation of the shaft of said stepper motor, said first and second signals differing in phase by 90 degrees; and translation logic connected to receive said first and second signals from said encoder for reordering the sequence of signal pulses received from said encoder, said translation circuit providing first and second translated encoder signals to said control logic;

and wherein:

said control logic is responsive to said first and second translated encoder signals to modulate operation of said stepper motor; and said translation logic is responsive to a configuration signal received from said control logic to select the reorder sequence of said signal pulses received from said encoder.

5. The drive circuit according to claim 4, wherein:

said encoder has a resolution which is a multiple of the resolution of said stepper motor.

6. The drive circuit according to claim 4, wherein said control logic includes:

initialization logic connected to receive said first and second encoder signals and to provide said configuration signal to said translation logic, wherein said initialization logic executes the following steps upon powering on said stepper motor:

senses the state of said first and second encoder signals;

extracts configuration information corresponding to the state of said first and second encoder signals and the direction of rotation of said stepper motor from a look-up table; and provides said configuration information to said translation logic via said configuration signal.

* * * * *